United States Patent
Dietrich (10) Patent No.: US 10,368,282 B2
(45) Date of Patent: Jul. 30, 2019

(54) MODE CONTROL DESIGN

(71) Applicant: Itron Networked Solutions, Inc., San Jose, CA (US)

(72) Inventor: Paul Dietrich, San Jose, CA (US)

(73) Assignee: ITRON NETWORKED SOLUTIONS, INC., Liberty Lake, WA (US)

(*) Notice: Subject to any disclaimer, the term of this patent is extended or adjusted under 35 U.S.C. 154(b) by 0 days.

(21) Appl. No.: 15/912,115

(22) Filed: Mar. 5, 2018

(65) Prior Publication Data

US 2018/0255495 A1    Sep. 6, 2018

Related U.S. Application Data

(60) Provisional application No. 62/466,812, filed on Mar. 3, 2017.

(51) Int. Cl.

| | |
|---|---|
| *H04W 36/16* | (2009.01) |
| *H04W 8/00* | (2009.01) |
| *H04W 88/06* | (2009.01) |
| *H04W 36/30* | (2009.01) |
| *H04W 72/08* | (2009.01) |
| *H04W 24/02* | (2009.01) |

(52) U.S. Cl.
CPC ......... *H04W 36/165* (2013.01); *H04W 8/005* (2013.01); *H04W 36/30* (2013.01); *H04W 72/08* (2013.01); *H04W 88/06* (2013.01); *H04W 24/02* (2013.01)

(58) Field of Classification Search
CPC ... H04W 8/005; H04W 24/02; H04W 36/165; H04W 36/30; H04W 72/08; H04W 88/06
See application file for complete search history.

(56) References Cited

U.S. PATENT DOCUMENTS

| | | | | |
|---|---|---|---|---|
| 9,791,551 | B1* | 10/2017 | Eshraghi | G01S 13/347 |
| 2003/0118143 | A1* | 6/2003 | Bellaouar | H03C 3/0925 |
| | | | | 375/376 |
| 2004/0022176 | A1* | 2/2004 | Hashimoto | H04L 1/0003 |
| | | | | 370/204 |

(Continued)

OTHER PUBLICATIONS

InnovationQ Patent and PGPub search; Mar. 15, 2019 (Year: 2019).*
InnovationQ NPL search; Mar. 15, 2019 (Year: 2019).*
IEEE NPL search; Mar. 15, 2019 (Year: 2019).*

*Primary Examiner* — Benjamin H Elliott, IV (57) ABSTRACT

A method for optimizing communication modes between network nodes includes: storing, in a first node in a communication network, a data success rate for each of a plurality of communication modes; receiving, by the first node, mode data from a second node in the communication network including at least a mode identifier for at least two of the plurality of communication modes; determining, by the first node, a metric for each of the at least two communication modes based on at least a data success rate of transmissions using the respective communication mode; selecting, by the first node, a preferred communication mode of the at least two communication modes based on the determined metric for each of the at least two communication modes; and transmitting, by the first node, an initiation data message to the second node via the communication network indicating the selected preferred communication mode.

16 Claims, 4 Drawing Sheets

212

| Mode ID | Mode | D(M) | Supported | Metric |
|---|---|---|---|---|
| 123456 | 100 kbps MSK | 0.95 | X | 86 |
| 456789 | 150 kbps MSK | 0.90 | | 90 |
| 246802 | 200 kbps GMSK | 0.85 | | 78 |
| 135791 | 300 kbps GMSK | 0.80 | X | 50 |

(56) References Cited

U.S. PATENT DOCUMENTS

| | | | |
|---|---|---|---|
| 2004/0179630 A1* | 9/2004 | O'Shea | H04L 25/03834 |
| | | | 375/305 |
| 2005/0099975 A1* | 5/2005 | Catreux | H04L 1/0001 |
| | | | 370/329 |
| 2006/0145758 A1* | 7/2006 | Klomsdorf | H03F 1/02 |
| | | | 330/129 |
| 2008/0013643 A1* | 1/2008 | Lee | H04L 25/03834 |
| | | | 375/274 |
| 2009/0262850 A1* | 10/2009 | Catreux | H04L 1/0001 |
| | | | 375/260 |
| 2012/0077447 A1* | 3/2012 | Rofougaran | H01L 23/66 |
| | | | 455/73 |
| 2015/0249509 A2* | 9/2015 | Linn | H04L 27/3818 |
| | | | 375/227 |
| 2016/0323892 A1* | 11/2016 | Pradini | H04B 7/15557 |
| 2017/0207938 A1* | 7/2017 | Niemela | H04L 25/03834 |
| 2018/0103455 A1* | 4/2018 | Karimli | H04W 72/02 |
| 2018/0255495 A1* | 9/2018 | Dietrich | H04W 36/165 |

* cited by examiner

| Mode ID | Mode | D(M) | Supported | Metric |
|---------|-----------------|------|-----------|--------|
| 123456  | 100 kbps MSK    | 0.95 | X         | 86     |
| 456789  | 150 kbps MSK    | 0.90 |           | 90     |
| 246802  | 200 kbps GMSK   | 0.85 | X         | 78     |
| 135791  | 300 kbps GMSK   | 0.80 |           | 50     |

MODE CONTROL DESIGN

FIELD

The present disclosure relates to the control of communication modes in nodes connected via a communication network, specifically the use of data success rates and communication speeds to determine metrics for use in selecting a preferred communication method between two nodes.

BACKGROUND

Communication networks that are comprised of a plurality of different nodes often utilize a single or uniform communication scheme when the network is first implemented. Over time, new technology may become available to provide for increased speeds, greater coverage, stronger signals, etc. for network nodes and the communication modes that they use. However, unless old, outdated nodes can be modified (e.g., via a software deployment) to utilize new communication modes, each node must be replaced to take advantage of better technology. For larger networks, this may entail replacing tens of thousands of nodes in order to utilize newer communication modes.

In an effort to take advantage of higher speeds or other newer types of communication modes, some nodes have been configured to implement mode switching. Mode switching is where a node will actively change the communication mode that it uses when communicating with other nodes. In many cases, mode switching can be as simple as utilizing the best (e.g., fastest, strongest, or other criteria that may be chosen based on the application) communication mode available, and then cycling through the next best mode as need be until a communication is successful. However, this can be time consuming and inefficient, especially in larger networks or in cases where communications are time-sensitive. Thus, there is a need for a more efficient and effective method of mode switching for nodes in a communication network.

SUMMARY

The present disclosure provides a description of systems and methods for optimizing communication modes between network nodes. When a node in a communication network discovers its neighboring nodes, an exchange of available communication modes is made. Each node is configured to be able to determine data success rates for each of the available modes and use such rates, along with other available data, to calculate a metric for each of the communication modes that may be used with each neighboring node. The metric is used by the node to select a preferred communication mode for communicating with each of its neighbors. As communications are made, the metric can be updated in real-time by the node based on changes in data success rates and other data, such that a preferred mode is always used to ensure the most efficient and best possible operation in the network.

A method for optimizing communication modes between network nodes includes: storing, in a first node in a communication network, a data success rate for each of a plurality of communication modes; receiving, by the first node, mode data from a second node in the communication network including at least a mode identifier for at least two of the plurality of communication modes; determining, by the first node, a metric for each of the at least two communication modes based on at least a data success rate of transmissions using the respective communication mode; selecting, by the first node, a preferred communication mode of the at least two communication modes based on the determined metric for each of the at least two communication modes; and transmitting, by the first node, an initiation data message to the second node via the communication network indicating the selected preferred communication mode.

A system for optimizing communication modes between network nodes includes: a communication network configured to facilitate data transmissions between a first node and a second node; the first node configured to store a data success rate for each of a plurality of communication modes, receive mode data from a second node in the communication network including at least a mode identifier for at least two of the plurality of communication modes, determine a metric for each of the at least two communication modes based on at least a data success rate of transmissions using the respective communication mode, select a preferred communication mode of the at least two communication modes based on the determined metric for each of the at least two communication modes, and transmit an initiation data message to the second node via the communication network indicating the selected preferred communication mode; and the second node.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Optimizing Communication Between Network Nodes

Figure 1:
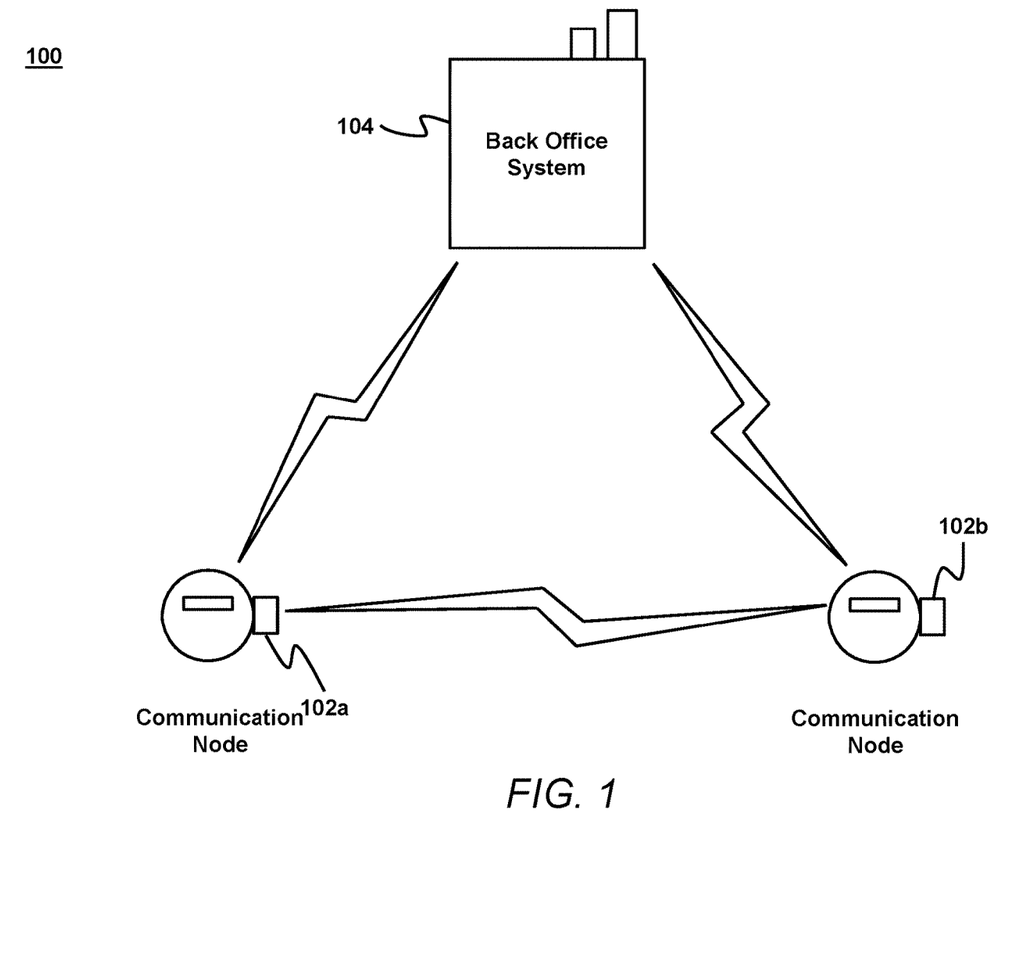
FIG. 1 is a high level architecture illustrating a system for optimizing communication modes between network nodes in accordance with exemplary embodiments.

FIG. 1 illustrates a system 100 for optimizing communication between two nodes in a communication network by selecting a preferred communication mode that can be utilized by both network nodes of a plurality of different possible communication modes. The system 100 may include a communication network that includes at least two communication nodes 102, illustrated in FIG. 1 as communication nodes 102*a* and 102*b*. Each of the communication nodes 102, discussed in more detail below, may be configured to transmit and receive data messages from other communication nodes 102 in the network. A communication node 102 may be configured to transmit and/or receive data messages using a plurality of different communication modes. A communication mode may be defined by one or more settings or characteristics that affect data transmissions made to or from a communication node 102, such as by varying in speed, bandwidth, protocol, technology used, etc. For instance, one communication mode may be transmissions with 100 kbps bandwidth using minimum shift keying (MSK), while another communication mode may be transmissions with 300 kbps bandwidth using Gaussian minimum shift keying (GMSK).

Each communication node 102 may maintain a mode table that is stored in a memory or other suitable storage mechanism of the communication node 102. The mode table may store data regarding each of the communication modes that the communication node 102 may be capable of using. Such data may include, for instance, specifications of the communication mode and a data success rate indicative of the success of transmissions made to and/or from the communication node 102 using that communication mode. The data may also include a unique identifier associated with each communication mode, where the unique identifier may be any suitable type of value (e.g., numeric, alphanumeric, hexadecimal, etc.) that is unique to that communication mode among all potential communication modes.

In some embodiments, each of the communication nodes 102 may communicate with, either directly or indirectly (e.g., via one or more other communication nodes 102), a back office system 104. The back office system 104 may be configured to maintain a global mode table, which may store the data for each communication mode that may be used by any communication node 102 in the network. In some cases, any individual communication node 102 may only locally store data for communication modes through which that respective communication node 102 may communicate. In other cases, each communication node 102 may store the entire mode table, which may be received from and/or updated by the back office system 104.

In the system 100, each of the communication nodes 102 may be configured to identify the communication mode that should be used when communicating with a neighboring communication node 102 in the communication network. In an exemplary embodiment, the communication nodes 102 may be configured to identify a metric value for each potential communication mode, which may be used by the communication node 102 in selecting a communication mode for use in communicating with another communication node 102. When a communication node 102a discovers a new neighboring communication node 102b, each of the communication nodes 102a and 102b may share data regarding the communication modes each node 102 is capable of using. The communication node 102a may electronically transmit, using a default communication mode, at least the unique identifier for each communication mode supported by the communication node 102a to the communication node 102b, and vice versa. In some cases, the communication nodes 102a and 102b may also exchange the unique identifier for communication modes for which the communication nodes 102a and 102b listen (e.g., for receipt of data messages even if that mode is not used to transmit data messages), channels on which the communication node 102 may operate, as well as data indicating if the communication node 102 supports any particular technology, protocol, etc., which may be used in some communications.

After the data has been exchanged, each of the communication nodes 102a and 102b may store the data received from the other communication node 102 in a local memory or other suitable data storage. The communication node 102 may then be configured to identify a metric value for each of the communication modes that may be used to communicate with the neighboring communication node 102. The metric may be identified using at least a data success rate for that communication mode. In some instances, the data success rate may be an estimate based on communications with other nodes 102, data received from the back office system 104, or other considerations. In other instances, the data success rate may initially be an estimate, but may be updated once communications have been exchanged with the neighboring communication node 102 using that respective communication mode.

In one embodiment, the metric may be identified using the data success rate as well as two constants, where the constants may be dependent on the media access control (MAC) protocol used in the communication mode. For instance, the metric value may be identified using the following equation:

$$\text{Metric} = (C_1 + C_2(M))^{\left(\frac{1}{D(M)}\right)}$$

where $C_1$ and $C_2$ are the constants, M is the communication mode, and D(M) is the data success rate for that mode M. Each of the values of the constants $C_1$ and $C_2$ may be adjusted based on the effectiveness of the values used and the resulting communications in the communication network. For instance, the value for $C_1$ may be four milliseconds and the value for $C_2$ may be eight milliseconds for a 300 kbps bandwidth or 24 milliseconds for a 100 kbps bandwidth. In another embodiment, the metric may be identified using an additional, third constant, $C_3$, representative of a backoff time, such as 20 milliseconds. In such an embodiment, the metric value may be identified using the following equation:

$$\text{Metric} = (C_1 + C_2(M))^{\left(\frac{1}{D(M)}\right)} + C3\left(2^{\left(\frac{1}{D(M)}-1\right)} - 1\right)$$

In yet another embodiment, the metric may be identified using a data rate for the mode, such as using the following equation:

$$\text{Metric} = \frac{1}{(D(M) * BPS(M))}$$

where BPS(M) is the date rate at mode M.

Each communication node 102 may identify a metric value using the appropriate equation for each mode through which the communication node 102 may communicate with the other communication node 102. The communication node 102 may then select a preferred communication mode for future communications, which may be based on the lowest metric value that is identified. For instance, the preferred communication mode may be the mode that yields the lowest metric value. The preferred communication mode may then be used when the communication node 102a communicates with the communication node 102b. In cases where each of the communication nodes 102a and 102b identify a different preferred communication mode, the communication node 102 that initiates the communication may select the communication mode to be used. The communication node 102 may then switch among communication modes when communicating with other communication nodes 102 in the communication network, using whichever communication mode is preferred for the other communication node 102 to which transmissions are being made.

In an exemplary embodiment, the communication node 102 may be configured to update the preferred communication mode for the neighboring communication nodes 102. In such an embodiment, the communication node 102 may update the data success rate for each communication mode for each of the neighboring communication nodes 102, may recalculate the metric values, and then select the preferred communication mode accordingly. In some cases, such an updating may be performed periodically, such as at a regular interval or when instructed by the back office system 104. In other cases, such an update may be performed any time the data success rate for a communication mode is updated, which may occur following any data message exchange with a neighboring communication node 102.

In some instances, a communication node 102 may use techniques to prevent rapid switching of communication modes. One such technique may include filtering, such as using infinite impulse response (IIR) filtering, where the success rate for each mode may be IIR filtered, such as using an alpha between 0.90 and 0.95. Another technique may be the use of hysteresis, such as by requiring that a new preferred mode is better (e.g., based on metric value) than the current preferred mode by a predetermined amount (e.g., at least 10% better). Yet another technique may be the use of time gating, such as by requiring that a preferred mode is used for at least a predetermined period of time before a new preferred mode may be selected.

In an exemplary embodiment, the initiator of communication between two communication nodes 102 may be configured to select the communication mode and channel to be used for a series of communications. In another embodiment, the transmitter of a data message may always select the communication mode and channel for the next packet that it transmits. In yet another embodiment, the recipient of a packet may select the communication mode and channel that the neighboring communication node 102 should use for its next transmission.

In some cases, a communication node 102 may use probabilities to determine when an alternative communication mode may be used in place of a preferred communication mode. For instance, in the mode table, the communication node 102 may store a probability for each communication mode that may be a probability that an alternate mode may be tested when that communication mode is preferred. In some cases, the probability may be based on the data success rate and/or metric value for that mode, or may be specified by the back office system 104. In such embodiments, when a new communication is to be made, the communication node 102 may perform a check to see if the alternate mode should be tested based on the probability of the preferred communication mode. In some cases, when a new communication mode is being tested, the initial message may be a poll-acknowledge transaction where the neighboring communication node is to send the acknowledge message at a default communication mode, such as to mitigate the possibility of the alternate communication mode failing later communications. In some cases, the alternate mode may be selected at random. In other cases, the alternate mode may be cycled through such that each potential communication mode is attempted before one is repeated. In some instances, the alternate mode may be the mode with the next best metric value. In some cases, the alternate mode may be the communication mode most similar to the preferred communication mode.

In some embodiments, a communication node 102 may use multiple values for the probability of testing an alternate mode. In such an embodiment, the communication node 102 may utilize an aggressive mode evaluation and a normal mode evaluation. The normal mode may be used by the communication node 102 unless metric values or other data (e.g., data success rates) begins to change significantly (e.g., faster than a preset threshold), at which time the aggressive mode evaluation may be used. In one example, the communication mode may use a moving average convergence divergence (MACD) of the probability using two validation states: one slow and one fast. If the fast metric deviates from the slow metric by a predetermined amount, the aggressive mode evaluation may be used until the deviation has lowered, at which time the normal mode evaluation may be used.

In some embodiments, a communication node 102 may be configured to remove communication modes that are not supported by neighboring communication nodes 102. For instance, once a communication node 102 has performed the discovery exchange of data with all of its neighboring nodes, any communication modes that are not supported by any of the neighboring nodes may be removed from the communication node 102 (e.g., from its local mode table). The remaining modes may be added to or rearranged in the mode table using any suitable criteria, such as based on signal-to-noise ratio.

The methods and systems discussed herein enable a communication node 102 to switch among communication modes for a neighboring communication node 102 to always be utilizing the most effective and efficient communication mode. In addition, the use of a mode table and identifying preferred communication modes for every neighboring node ensures that the best communication mode may be used in all communications with all other nodes, even in cases where the preferred communication mode may vary, such as due to the capabilities of the neighboring node, distance, communication infrastructure, etc. The use of metric values may ensure that the selected preferred communication mode is always the best to be used in any given situation, and enables fast and easy updating of the preferred communication mode when circumstances may change for the communication node 102 or a neighboring communication node. Thus, the methods and systems discussed herein provide for more effective and efficient mode switching than used in traditional systems.

Communication Node

Figure 2:
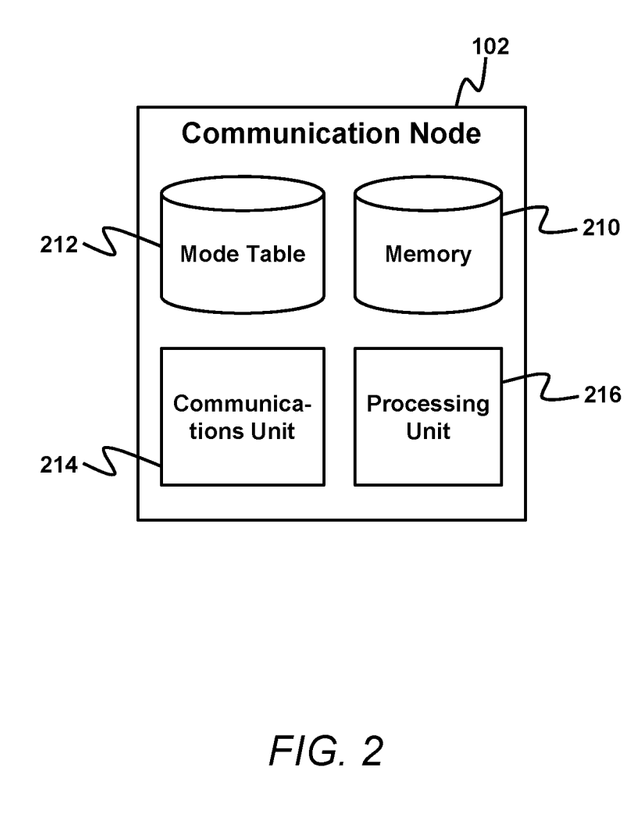
FIG. 2 is a high level block diagram illustrating an example architecture of a network node in the system of FIG. 1 in accordance with exemplary embodiments.

FIG. 2 illustrates an example architecture of a communication node 102 in the system 100 for use in identifying preferred communication modes in communications made with neighboring nodes in the system 100. It will be apparent to persons having skill in the relevant art that the components illustrated in FIG. 2 are only examples, and that the functions performed by the communication node 102 as discussed herein may be performed by additional and/or alternative components. In addition, the architecture of the communication node 102 illustrated in FIG. 2 is provided as an example, while other suitable architectures may be used as will be apparent to persons having skill in the relevant art.

The communication node 102 may include a memory 210. The memory 210 may be configured to store data for use by the communication node 102 in performing the functions discussed herein. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs executed by the communication node 102, and other data that may be suitable for use by the communication node 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein. The memory 210 may be configured to store, for example, protocols used in communication modes, equations and/or algorithms for identifying metric values, constants, data rate information, and other data used in identifying metric values, etc. In some cases, the memory 210 may include a mode table 212, discussed in more detail below. In other cases, the mode table 212 may be included in separate storage in the communication node 102.

The communication node 102 may also include a communications unit 214. The communications unit 214 may be configured to receive and transmit data over a communication network to one or more neighboring communication nodes 102 via one or more network protocols using one of a plurality of different communication modes. The communications unit 214 may be configured to use any suitable type of communication method, such as radio frequency, local area networks, wireless area networks, cellular communication networks, Bluetooth, the Internet, etc. In some embodiments, the communications unit 214 may be comprised of multiple devices or modules, such as different receiving devices for receiving data over different networks, such as a first receiving device for receiving data over a local area network and a second receiving device for receiving data via the Internet. The communications unit 214 may receive electronically transmitted data signals and electronically transmit data signals, where data may be superimposed or otherwise encoded on the data signal and decoded, parsed, read, or otherwise obtained via receipt of the data signal by the communications unit 214 or appropriate device (e.g., another communications node 102). In some instances, the communications unit 214 may include a parsing module for parsing received data signals to obtain the data superimposed thereon. For example, the communications unit 214 may include a parser program configured to receive and transform the received data signal into usable input for the functions performed by the communications node 102 to carry out the methods and systems described herein.

The communication node 102 may also include a processing unit 216. The processing unit 216 may be configured to perform the functions of the communication node 102 discussed herein as will be apparent to persons having skill in the relevant art. In some embodiments, the processing unit 216 may include and/or be comprised of a plurality of engines and/or modules specially configured to perform one or more functions of the processing unit 216. As used herein, the term "module" may be software or hardware specifically programmed to receive an input, perform one or more processes using the input, and provide an output. The input, output, and processes performed by various modules will be apparent to one skilled in the art based upon the present disclosure. For instance, the processing unit 216 may include a module configured to identify metric values, a module to update data success rates and other information in the mode table 212, modules used to perform functions of the communications node 102 in response to data messages received using the methods discussed herein, etc.

The communication node 102 may include the mode table 212. The mode table 212 may be a data table used to store data regarding communication modes, including at least a plurality of communication modes that may be used by the communication node 102 (e.g., via the communications unit 214). In some cases, the mode table 212 may only store data for the communication modes usable by the communication node 102. In other cases, the mode table 212 may store data for all communication modes, such as may be included in a global mode table maintained by the back office system 104. The mode table 212 may include at least the unique identifier for each of the communication modes and data regarding the communication mode itself (e.g., speed, bandwidth, protocol, etc.).

Figure 3:
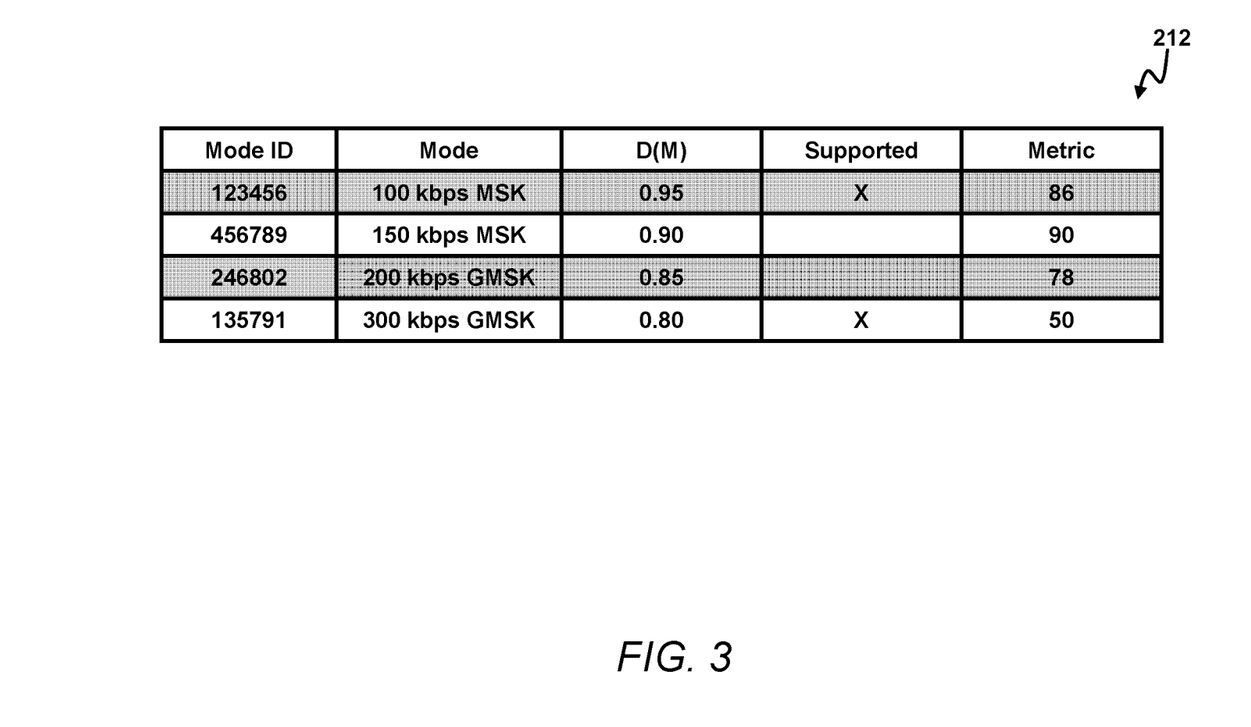
FIG. 3 is a diagram illustrating an example mode table used by the network node of FIG. 2 in accordance with exemplary embodiments.

FIG. 3 illustrates an example mode table 212. In the example mode table 212, the mode table 212 also stores, for each of the plurality of communication modes, the data success rate D(M) for the respective mode M, a flag indicating if that mode is supported by the communication node 102, and the metric value that has been identified for that specific mode M. In the illustrated example, the communication node 102 supports only the 100 kbps MSK and 300 kbps GMSK communication modes. Based on the identified metric values, the 300 kbps GMSK mode would be the preferred mode for the communication node 102. In some embodiments, an additional mode table 212 may be included in the communication node 102 for communication mode data related to a neighboring communication node 102.

For instance, the mode table 212 illustrated in FIG. 3 may correspond to a communication node 102b, where the supported flag may indicate the communication modes that the communication node 102b supports, while the communication node 102a may support all four modes. The metric values may be based on the data success rates for communications with the communication node 102b (e.g., actual or estimated, such as when the communication node 102b is first discovered). In such cases, the communication node 102 may maintain a different mode table 212, or have an appropriate number of entries in the mode table 212, for each discovered neighboring node. The communication node 102 may be configured to update the data success rates and metric values in the mode table 212 as necessary to maintain efficient operation and communication in the communication network.

In some embodiments, the mode table 212 may also include additional data that may be used by the communication node 102 in transmitting and/or receiving data messages using the respective communication mode. Such data may include, for instance, the data rate for the communication mode, overhead information including header and cyclic redundancy check information, channel bandwidth requirements for the communication mode, timing information for the communication mode, theoretical signal-to-noise ratio requirements, additional framing information, etc. In some instances, the data in the mode table 212 may be formatted based on the global mode table. For instance, the data rate information may be stored in kbps in the global mode table and stored accordingly in each communication node's local mode table 212 based thereon.

In some embodiments, a communication node 102 may also include a channel plan table, which may be similar to the mode table 212, but used for storing data regarding channel plans that are supported by the communication node 102. In some cases, the channel plan table may match or be based on a global channel plan table, such as may be maintained by the back office system 102. A channel plan table may include any data used by the communication node 102 regarding communication channels through which the communication node 102 may communicate, such as a unique identifier associated with the respective channel, a starting frequency, channel spacing, channel bandwidth, number of channels, maximum power, a restricted mask, channel flags, hop specific information (e.g., minimum channels, dwell time, etc.), etc.

Method for Identifying Preferred Communication Modes

Figure 4:
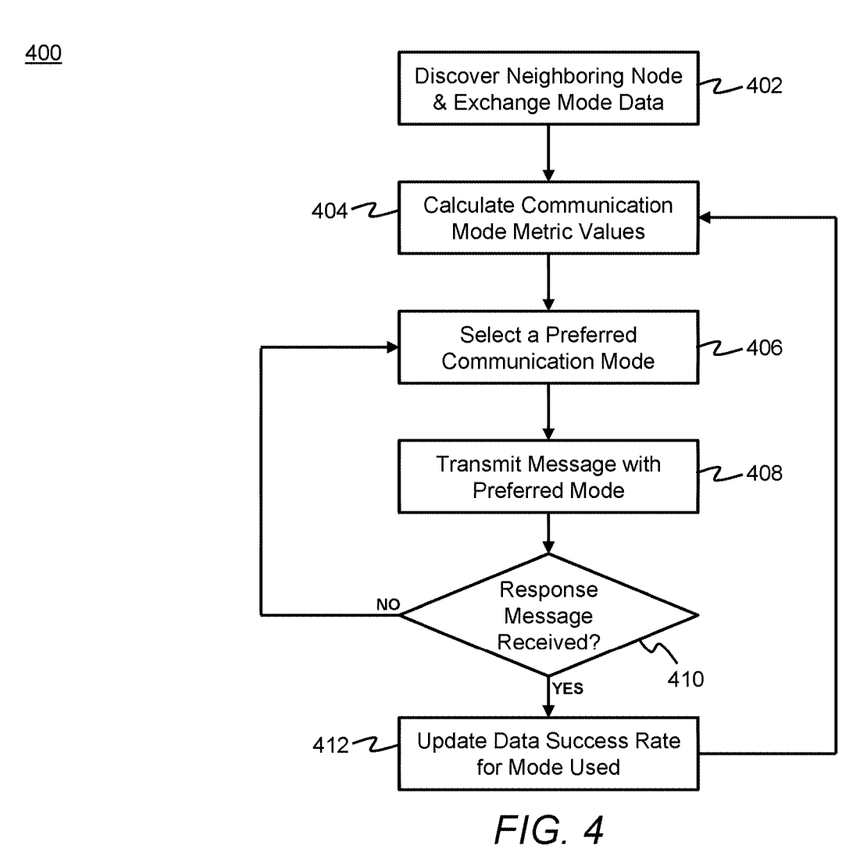
FIG. 4 is a flow chart illustrating an exemplary method for selecting a preferred communication mode optimized for a neighboring network node in the system of FIG. 1 in accordance with exemplary embodiments.

FIG. 4 illustrates a method 400 for identifying and updating a preferred communication mode for communications exchanged between two communication nodes 102 in the communication network in the system 100.

In step 402, the communication node 102a may discover a communication node 102b as a neighboring node in the communication network, and each of the communication nodes 102a and 102b may exchange mode data. The exchange of mode data may include each of the communication nodes 102a and 102b providing to the other communication node at least the unique identifier for each communication mode supported by the respective communication node (e.g., that can be used by the communications unit 214 in transmitting and/or receiving data messages). In some cases, the exchange may also include the exchange of unique identifiers for all communication modes through which the respective communication node 102 listens for data messages, as well as any other data that may be suitable in identifying preferred communication modes (e.g., default data success rates, mode table updates from the back office system 104, etc.). In some embodiments, the exchange may also include the exchange of data regarding communication channels in addition to communication modes, such as by providing the unique identifier for each communication channel supported by the communication node 102.

In step 404, the communication node 102a may calculate the metric values for each of the communication modes supported by the communication node 102b. The metric values may be based on at least the data success rate for each respective mode, as well as any other data that may be used, which may be dependent on the equation and/or algorithm used in identifying the metric value. For instance, the communication node 102a may use two constant values, where at least one of the values may vary based on the mode or a criteria thereof (e.g., bandwidth) for which the metric value is being identified. In some cases, the constant values may be changed or adjusted during operation of the system 100, such as based on feedback received from the back office system 104 or adjustments made directly by the communication node 102 (e.g., by the processing unit 216 thereof) based on data success rates or other available data.

In step 406, the communication node 102a may select a preferred communication mode for communications made with the communication node 102b. The preferred communication mode may be selected as the mode having the lowest metric value identified for that communication node 102b. In step 408, a data message may be transmitted from the communication node 102a to the communication node 102b using the preferred communication mode. In some embodiments, the data message may be a poll-acknowledge message that is transmitted using the preferred communication mode, but where the acknowledge message is requested to be transmitted using a default communication mode. In step 410, the communication mode 102a may determine if an acknowledge message has been received from the communication node 102b (e.g., using the preferred communication mode or default communication mode, as applicable). If no acknowledge has been received, then the method 400 may return to step 406 where a new preferred communication mode may be selected. For instance, the communication node 102a may then test an alternate mode, as discussed above.

If an acknowledge message is received from the communication node 102b, then the preferred communication mode may continue to be used in communications between the communication nodes 102a and 102b. In step 412, the communication node 102a may update the data success rate for the preferred communication mode based on the data messages being exchanged between the communication nodes 102a and 102b. The method 400 may then return to step 404, where the metric values may be recalculated using the updated data success rate. In cases where the data success rate may change, the metric value for the preferred mode may also change, which may result in a new preferred communication mode being selected. In some instances, the communication node 102a may use one or more techniques to determine if a new preferred communication mode should be selected upon change in the metric values, such as filtering, hysteresis, or time gating, such as discussed above. The communication node 102a may thus effectively switch between communication modes to fit the needs of the communication node 102b and any other neighboring node with which the communication node 102a communicates.

Techniques consistent with the present disclosure provide, among other features, systems and methods for optimizing communication modes between network nodes. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for optimizing communication modes between network nodes, comprising:

storing, in a first node in a communication network, a data success rate for each of a plurality of communication modes;

receiving, by the first node, mode data from a second node in the communication network including at least a mode identifier for at least two of the plurality of communication modes;

determining, by the first node, a metric for each of the at least two communication modes based on at least a data success rate of transmissions using the respective communication mode;

selecting, by the first node, a preferred communication mode of the at least two communication modes based on the determined metric for each of the at least two communication modes; and transmitting, by the first node, an initiation data message to the second node via the communication network indicating the selected preferred communication mode.

2. The method of claim 1, further comprising:

receiving, by the first node, one or more response packets from the second node in the communication network using the preferred communication mode; and updating, in the first node, the stored data success rate for the preferred communication mode based on at least a number of received response packets.

3. The method of claim 2, further comprising:
updating, by the first node, the metric for the preferred communication mode based on at least the updated data success rate.

4. The method of claim 3, further comprising:
selecting, by the first node, a new preferred communication mode of the at least two communication modes based on the determined metric for each of the at least two communication nodes including the updated metric; and
transmitting, by the first node, a new data message to the second node via the communication network indicating the new preferred communication mode.

5. The method of claim 4, wherein the new data message requests that an acknowledgement message be transmitted at a predetermined mode different from the new preferred communication mode.

6. The method of claim 5, wherein the predetermined mode uses 100 kbps bandwidth.

7. The method of claim 4, wherein the new preferred communication mode is selected only if the determined metric is at least a predetermined amount lower than the updated metric for the preferred communication mode.

8. The method of claim 4, wherein the new preferred communication mode is selected only if the preferred communication mode has not been changed for a predetermined period of time.

9. A system for optimizing communication modes between network nodes, comprising:
a communication network configured to facilitate data transmissions between a first node and a second node;
the first node configured to
store a data success rate for each of a plurality of communication modes,
receive mode data from a second node in the communication network including at least a mode identifier for at least two of the plurality of communication modes,
determine a metric for each of the at least two communication modes based on at least a data success rate of transmissions using the respective communication mode,
select a preferred communication mode of the at least two communication modes based on the determined metric for each of the at least two communication modes, and
transmit an initiation data message to the second node via the communication network indicating the selected preferred communication mode; and
the second node.

10. The system of claim 9, wherein the first node is further configured to
receive one or more response packets from the second node in the communication network using the preferred communication mode, and
update, in the first node, the stored data success rate for the preferred communication mode based on at least a number of received response packets.

11. The system of claim 10, wherein the first node is further configured to update the metric for the preferred communication mode based on at least the updated data success rate.

12. The system of claim 11, wherein the first node is further configured to
select a new preferred communication mode of the at least two communication modes based on the determined metric for each of the at least two communication nodes including the updated metric, and
transmit a new data message to the second node via the communication network indicating the new preferred communication mode.

13. The system of claim 12, wherein the new data message requests that an acknowledgement message be transmitted at a predetermined mode different from the new preferred communication mode.

14. The system of claim 13, wherein the predetermined mode uses 100 kbps bandwidth.

15. The system of claim 12, wherein the new preferred communication mode is selected only if the determined metric is at least a predetermined amount lower than the updated metric for the preferred communication mode.

16. The system of claim 12, wherein the new preferred communication mode is selected only if the preferred communication mode has not been changed for a predetermined period of time.

* * * * *